L. MERRILL.
Curry-Combs.

No. 151,146.

Patented May 19, 1874.

Witnesses,
Harry Smith
Hubert Howson

Lewis Merrill
By his Attys.
Howson and Son.

UNITED STATES PATENT OFFICE.

LEWIS MERRILL, OF PHILADELPHIA, PENNSYLVANIA.

IMPROVEMENT IN CURRY-COMBS.

Specification forming part of Letters Patent No. 151,146, dated May 19, 1874; application filed April 15, 1874.

*To all whom it may concern:*

Figure 1:
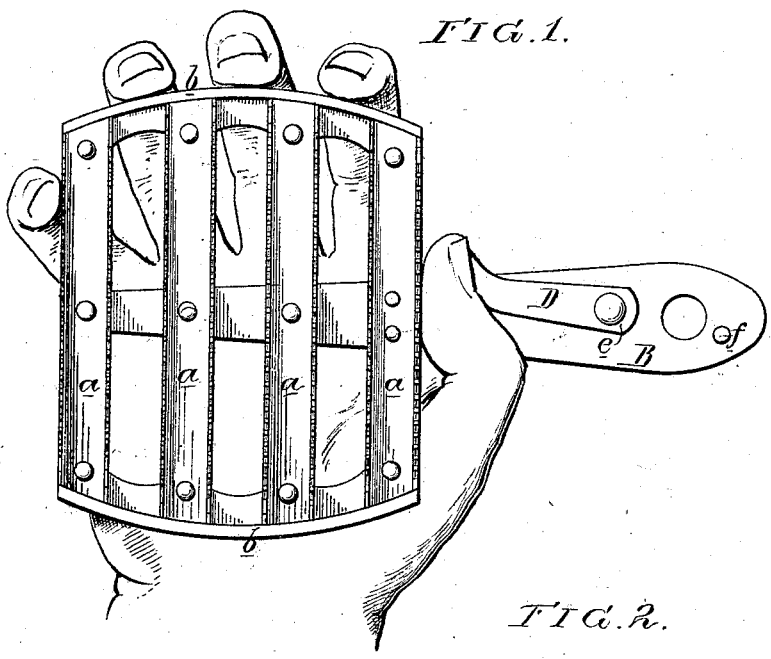
Figure 2:
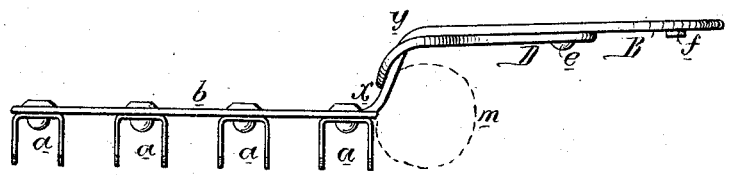

Be it known that I, LEWIS MERRILL, of the city of Philadelphia, Pennsylvania, have invented an Improvement in Curry-Combs, of which the following is a specification:

The object of my invention is to make a curry-comb which shall be more convenient to manipulate and otherwise more serviceable than those in common use, and this object I attain by constructing the comb in the manner illustrated in the face view, Figure 1, and edge view, Fig. 2, of the accompanying drawing.

Cavalry soldiers, hostlers, and others, whose duty it is to groom horses, invariably hold a curry-comb in the palm of the hand and grasp the edges by and between the fingers and thumb, as shown in Fig. 1, the thumb occupying a position under and against the handle. The only departure from this practice is when the operator may occasionally seize the handle for the purpose of applying the comb to parts of the animal which cannot be conveniently reached if the comb is held as shown in Fig. 1.

In the construction of curry-combs little or no regard has been paid to this method of holding the instrument. While it is possible to thus hold most of the combs now made, and while it is a fact that they are thus held, it is always at the cost of discomfort and inconvenience to the operator, no provision being made for the easy and firm position of the thumb and forefinger, as the handle consists of a shank riveted to the back of the comb, and a wooden piece driven onto the shank, the whole forming a cumbrous and inconvenient handle, not adapted to the almost universal mode of holding the instrument. I remedy these defects in a manner which I will now proceed more fully to explain.

The comb proper consists of the usual bent strips, $a$, with serrated edges, these strips being riveted to end pieces, $b$, which I prefer to make of malleable cast-iron or of wrought-iron struck up to the proper shape. I dispense entirely with the usual wooden handle, and make both shank and handle of one broad flat piece of metal, the shank, which is riveted to the bars of the comb, being bent as shown in Fig. 2, the first bend occurring at $x$, close to the first bar $a$, and the second bend occurring at $y$, which is at a distance from $x$, determined by the average size of a man's thumb. From the point $y$ the shank merges into the handle B, both shank and handle being composed of the one flat piece of iron shown, so that the usual cumbrous and inconvenient wooden handle is dispensed with. By bending the shank at $x\ y$ a broad flat shoulder is formed for the lodgment of the thumb and forefinger at a point most convenient for the manipulation of the instrument; for the extent of the bend permits the placing of the thumb, represented by the circle $m$ in Fig. 2, at such a distance from the currying-edge of the strips $a$ that it does not come in contact with the hair of the horse. This lodgment for the thumb and forefinger is made convenient for the operator, owing to the shank at the bend being of flat iron, bent with reference to fitting the thumb and forefinger, respectively, under and over it.

Figure 3:
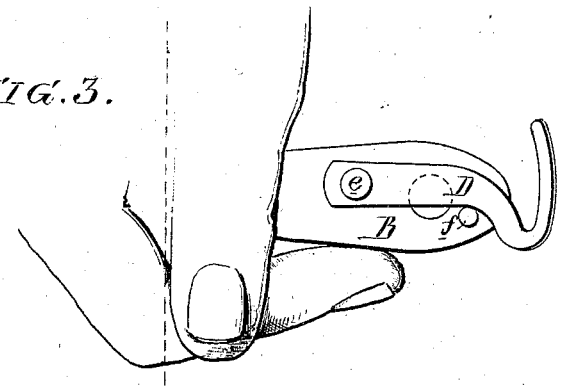

Another feature of my improvement is the utilizing of the handle by making it a medium for carrying a hook, D, by which a horse's hoof may be readily cleaned. The stem of this hook is pivoted to the handle at $e$, and the outer end is so bent that when closed, as shown in Fig. 1, the hook will overlap the handle and be out of the way of the operator's thumb. When required for use, the hook may be turned on the pin $e$, to the position seen in Fig. 3, when the handle may be used as a medium for manipulating the hook, as shown.

I do not desire to claim, broadly, a curry-comb having a shank bent so as to afford a lodgment for the operator's thumb; but

I claim as my invention—

1. A curry-comb, having a bent shank, $x\ y$, and handle B, composed of one piece of flat metal, as shown and described.

2. The combination, with the handle B, of a hook, D, pivoted and otherwise adapted to the handle, substantially as specified.

In testimony whereof I have signed my name to this specification in the presence of two subscribing witnesses.

LEWIS MERRILL.

Witnesses:
WM. A. STEEL,
HUBERT HOWSON.